United States Patent [19]
Fukushima et al.

[11] Patent Number: 5,717,435
[45] Date of Patent: Feb. 10, 1998

[54] SIDE SWITCH MECHANISM, AND STYLUS PEN USING THE SAME

[75] Inventors: Yasuyuki Fukushima; Minoru Wakabayashi, both of Otone-machi, Japan

[73] Assignee: Wacom Co., Ltd., Japan

[21] Appl. No.: 545,071

[22] Filed: Oct. 19, 1995

[51] Int. Cl.$^6$ .................................................. G09G 5/00
[52] U.S. Cl. ........................... 345/179; 345/180; 401/195
[58] Field of Search ................................. 345/179, 180, 345/173, 175; 178/18, 19; 401/195; 362/118

[56] References Cited

U.S. PATENT DOCUMENTS 5,384,688  1/1995  Rockwell ................. 345/179

FOREIGN PATENT DOCUMENTS

| 2-53805 | 9/1986 | Japan . |
| 63-257823 | 10/1988 | Japan . |
| 64-53223 | 3/1989 | Japan . |
| 3-147012 | 6/1991 | Japan . |
| 4-96212 | 3/1992 | Japan . |
| 5-275283 | 10/1993 | Japan . |

*Primary Examiner*—Mark R. Powell
*Assistant Examiner*—Matthew Luu
*Attorney, Agent, or Firm*—Joseph W. Berenato, III

[57] ABSTRACT

A side switch mechanism which provides comfortable operation of a pair of side switches of a stylus pen and implements facilitated construction and assembly. The side switch mechanism has a side switch member having a surface construction and a rear construction. The surface construction includes a pair of knobs which are longitudinally spaced apart from each other so as to press either of two specific switching elements when the switching elements are respectively turned on. The rear surface construction includes a pair of switch pressing sections made of projections, each being provided on the rear surface so as to correspond to each knob. The switch pressing section turns on only one of the two switching elements when a corresponding one of the pair of knobs is pressed. The rear surface construction further includes fitting portions for attaching the side switch member to the casing. The side switch mechanism also has fulcrums integrally formed in the casing to support the fitting portions, so that the side switch member pivots on the fitting portions which serve as fulcrums.

11 Claims, 7 Drawing Sheets

PRIOR ART

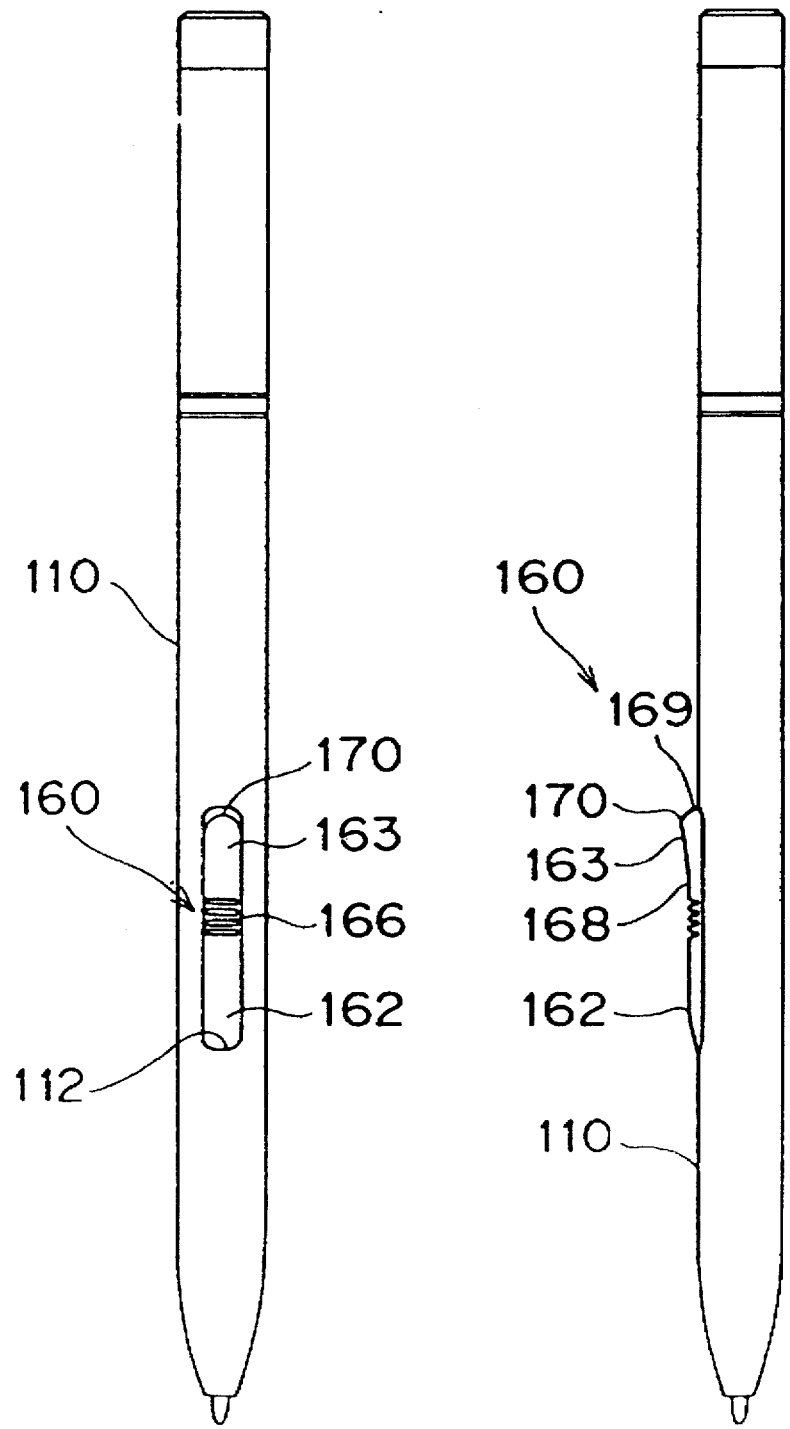

SIDE SWITCH MECHANISM, AND STYLUS PEN USING THE SAME

BACKGROUND OF THE INVENTION

1. Field of the Invention

The present invention relates to a position indicator, such as a stylus pen, for use in a coordinate input device called a digitizer or a tablet which is one of various input devices for a computer, and more particularly to a stylus pen having a side switch.

2. Description of the Prior Art

A stylus pen (hereinafter often referred to simply as a pen) used with a position indicator of a digitizer is generally configured so as not only to detect a coordinate value of an indicated position but also to detect switching or pen-down information. The pen-down state is a state in which the tip end of the pen is in contact with a position sensing plane. The pen-down state is generally sensed by detecting that component of a pressing force, i.e., a tool force applied to a member provided at the tip end of the pen, which is transmitted in the direction of the axis of the pen.

Before the construction of such a stylus pen is explained, the position sensing method employed in a digitizer will first be explained. Although there are various position sensing methods for a digitizer, an electromagnetic transfer method will be explained as one example of the position sensing methods. The electromagnetic transfer method uses a position sensing plane in which a plurality of, for example, sensor coils are arranged side by side in the direction of position sensing, and a position indicator such as a pen or a cursor in combination. Position sensing is usually carried out in two directions, that is, X and Y directions, and hence two position sensing planes are provided in the X and Y directions so as to intersect at right angles. The position indicator is provided with a coil or a resonance circuit for bringing about electromagnetic interaction between the coil or resonance circuit and the sensor coils. For example, a position is sensed by transmitting electromagnetic waves from sensor coils (from a position sensing plane side), and receiving response electromagnetic waves, which are re-radiated as a result of interaction between a resonance circuit within a position indicator and the transmitted electromagnetic waves, back at the sensor coils. Based on signals from the sensor coil which received the signal having the largest intensity and from sensor coils adjacent thereto, calculation including interpolation is carried out, whereby coordinates are determined.

One of the characteristics of this electromagnetic wave transfer method resides in that the position indicator can be constructed as a cordless type, and that the position indicator does not require a power supply. The details of this electromagnetic wave transfer method are disclosed in Japanese Patent Publn. No. Hei-2-53805 and Japanese Patent Application Laid-open No. Hei-3-147012.

In addition to the previous by described method, in another method, an electromagnetic wave sent from the position sensing plane is received by a position indicator. Conversely, in still another simple electromagnetic method, an electromagnetic wave sent from the position indicator is received by the position sensing plane.

The position indicator, employing a method for sensing a position by utilization of the previously mentioned electromagnetic interaction, houses, therein, a coil or a resonance circuit having a predetermined resonance condition. The position indicator generally has such a construction that the resonance condition of the coil or the resonance circuit changes from its original resonance condition by turning on a switch provided on the position indicator to input switching information at a desired position or by applying a tool force as a result of the pen-down action of the stylus pen. The variation in the resonance condition of the position indicator is reflected in the response electromagnetic wave, i.e., a received signal. Therefore, the switching information or the pen-down information will be obtained by analyzing the phase of the received signal in a signal processing section of the coordinate input device.

Various constructions of the position indicator have already been put forward which allow the resonance condition to change as a result of switching or pen-down action. For instance, in the case of a construction utilizing the switching action, the resonance circuit, or the like, is provided with additional coils, capacitors, or resistors which are turned on and off by the switch. The details of this construction are disclosed in Japanese Patent Application Laid-open Nos. Sho-63(1988)-257823, 64(1989)-53223, Hei-1(1989)-53223, Hei-4(1992)-96212, and Hei-5(1993)-275283.

After having been transferred to a data processor, together with coordinate information, the switching information is recognized as an event occurrence condition by an operating system (OS) or an application. As a result, various processing operations, previously assigned to each switching information, are executed. The pen-down information can be utilized, in the same way as the switching information, by assigning various processing thereto, in addition to it being recognized literally as a tool force (for example, it is reflected in the light and shade of a line drawn on a screen).

In this way, the provision of the switch on the position indicator for inputting the switch information allows various information, in addition to the coordinate information, to be inputted by the use of one position indicator. Therefore, as an example, if specialized switches are respectively provided on the position indicator respectively for several frequently utilized processing items, operability will be further improved. For this reason, there are also known position indicators provided with a plurality of switches to input the switch information. However, in the case of a stylus pen, it is difficult to provide many switches thereon because of its geometrical limitations. If the pen is provided with many switches, the operability of the pen will be impaired. Therefore, one or two switches (hereinafter often referred to as a side switch) are commonly provided on the side surface of a cylindrical housing which is similar to a writing implement.

FIG. 1 is a top view showing one example of a conventional stylus pen provided with two switches. A conventional stylus pen 10 shown in FIG. 1 is provided with an essentially cylindrical casing 12 which forms a housing, and a nib 18 fitted into an opening 12a formed at the tapered leading end of the casing 12 with the tip end of the nib 18 projecting outside. Two switches 14 and 16 are spaced at given intervals on the outer peripheral surface of the casing 12 of the stylus pen 10 for inputting switching information. The top of each of the switches 14 and 16 appropriately protrudes from the outer peripheral surface of the casing 12. To be more specific, the switches 14 and 16 shown in FIG. 1 are members which a user presses to turn a switching mechanism provided within the casing 12, or electrical contacts included in the switches, on and off, either indirectly or directly using a finger. These members, or portions equivalent to these members, will be hereinafter often referred to as a switch knob or knob. The mechanism of these switch knobs 14 and 16 is such that the knobs 14 and 16 move into the casing 12 upon depression, but return to their original positions when released from the depressed state. Normally, a switching mechanism or a switching element is provided just below each of the switch knobs 14 and 16 within the casing 12. When either the switch knob 14 or the switch knob 16 is pressed, an electrical contact provided just below the pressed switch knob is closed, and it opens when the switch knob is released.

The switch knobs 14 and 16 of the stylus pen 19 are completely independent of each other in view of their mechanical action. For this reason, these two switches may be pressed simultaneously. Particularly, if the switches are positioned close together, compared with the size of the user's finger, this is liable to happen. However, if the coordinate input device or the signal processing section of the data processor is not designed on the basis of such an assumption, such an operation will result in malfunction. However, if the two switch knobs are spaced too far apart from each other, the pressing action of each switch knob will become very laborious.

FIGS. 2A to 2C show an example of a conventional stylus pen 20 designed to prevent simultaneous pressing of two switch knobs. Differing from the switches in the stylus pen shown in FIG. 1, switch knobs 24 and 26 of the stylus pen shown in FIGS. 2A to 2C have different constructions. FIG. 2A is a front view of the stylus pen 20 as viewed from the switch knobs 24 and 26. The switch knobs 24 and 26 are integrated with a side switch member 25 which is substantially elongated in the direction of the axis of the stylus pen 20. In other words, the switch knobs 24 and 26 are provided in the vicinity of each end of the side switch member 25, and also they are arranged to be symmetrical about the center of the side switch member 25.

FIG. 2B is a side elevation of the stylus pen 20. The side switch member 25 is provided so as to protrude from the outer peripheral surface of a casing 22 of the stylus pen 20 to a certain extent. In addition, the side switches 24 and 26 also project slightly from the side switch member 25.

FIG. 2C is a schematic cross-sectional view of the stylus pen 20 shown in FIG. 2B. The side switch member 25 is disposed within an elongated opening 23 formed in the casing 22. Two switch pressing projections 27 and 28 are provided on the inner surface of the side switch member 25 at the positions corresponding to the bottoms of the switches 24 and 26. For example, a slot-shaped recess 25a is formed at the longitudinal center of the side switch member 25. A substrate 30 is fixedly held within the casing 22 by a substrate holder 32, or the like. Primarily, elements forming a resonance circuit of the stylus pen 22 and elements for controlling a resonance condition are mounted on the substrate 30. Among them, switch elements 34 and 36 for inputting switching information are respectively disposed just below the switch pressing projections 27 and 28 of the side switch member 25. A support member 35 is also provided on the substrate 30 to support the side switch member 25 by means of the recess 25a. The top of the support member 35 is fitted to the recess 25a of the side switch member 25 and functions as a pivot for the side switch member 25. By virtue of such a construction, the side switch member 25 is pivotally supported by the support member 35 (around the axis perpendicular to the plane of the drawing sheet) with the top thereof being used as a fulcrum.

In the case of the stylus pen 20 shown in FIGS. 2A to 2C, the switch knob 24 moves into the casing 22 when pressed, whereas the switch knob 26 simultaneously moves to the outside. At this time, the switch pressing projection 27 provided on the back surface of the switch knob 24 depresses the top of the switching element 34 on the substrate 30, whereby the electrical contact of the switching element 34 is closed. On the other hand, when the switch knob 26 is pressed, a reverse operation is carried out, so that the electrical contact of the switching element 34 is closed. In either case, as a result of the release of the switch knob, the side switch member 25 returns to its original position. Thus, the side switch member 25 pivotally moves as on a see-saw with the top of the support member 35 being used as a fulcrum. It is possible for a user to press either of the ends of the side switch member 25 but impossible to press both at the same time.

It is possible for the construction shown in FIGS. 2A to 2C, i.e., the two switch knobs coupled together by the side switch member to prevent the two switch knobs from being simultaneously pressed. However, the construction shown in FIGS. 2A to 2C suffers from the following problems.

Specifically, the support member 35 supporting the fulcrum of the side switch member 25 is disposed on the substrate 30. In other words, the provision of the support member on a member within the casing such as a substrate or a substrate holder results in a limited internal space even smaller. Especially, if the support member is disposed on the substrate, a space for mounting electronic elements will be made narrower. Further, the support member, which is an independent molding, must first be manufactured, and then the molding is mounted to the substrate. This results in complicated manufacturing steps and an increased cost.

Still another problem of this stylus pen 20 is that the conventional side switch member 25 shown in FIGS. 2A to 2C is designed to be completely symmetrical about the fulcrum. In other words, each of the switch knobs is spaced the same distance away from the fulcrum, and the height of each switch knob from the outer peripheral surface of the casing 22 when it is not pressed is the same. Furthermore, the side switch member 25, between the two switch knobs, assumes the shape of a substantially plain surface.

Generally, the side switches of the stylus pen are operated by an index finger or thumb of the user, and therefore it is ideal for the finger to move smoothly and naturally from one switch to the other switch. It is evident that designing the side switch to allow for the movement of an operator's finger is effective in improving the operability of the stylus pen. More specifically, the distance between the switch knobs and the shape of the surface with which the finger comes into contact have a great effect on the operability. The conventional see-saw type side switch as shown in FIGS. 2A to 2C is not designed so as to reduce the distance between the switch knobs to a minimum. The surface with which the finger comes into contact is flat and does not comfortably fit the rounded pad of a finger tip, thereby leading to laborious operation.

SUMMARY OF THE INVENTION

The present invention is conceived to overcome the previously mentioned drawbacks in the prior art, and the object of the present invention is to provide a see-saw type side switch having two switch knobs constructed in such a way as to implement comfortable operability, to facilitate manufacturing steps, and to reduce cost.

Another object of the present invention is to provide a stylus pen having the previously mentioned see-saw type side switch.

In the first aspect of the present invention, the side switch mechanism provided on a substantially cylindrical casing of a stylus pen which has a resonance circuit and a plurality of switching elements for inputting at least coordinate and switching information, the side switch mechanism being operated so as to turn on at least either of two specific switching elements among the plurality of switching elements at one time, the side switch mechanism comprises:

a side switch member having a surface construction including a pair of knobs which are longitudinally spaced apart from each other so as to press one of the knobs when the corresponding switching element is turned on, and a rear surface construction including a pair of pressing sections made of projections, each being provided on the rear surface so as to correspond to each knob, the pressing sections turning on only one of the two switching elements when a corresponding one of the pair of knobs is pressed, and fitting portions for attaching the side switch member to the casing at the substantial center between the pair of switch pressing sections, and fulcrums integrally formed in the casing for supporting the fitting portions, which serve as supporting points, so that the side switch member pivots on the fitting portions in such a way that one of the pair of the knobs moves downwards when that knob is pressed whereas the other knob moves inversely.

Here, the fulcrums integrated with the casing may be formed as a pair of projections protruding from opposing areas along the circumferential edge of an opening formed in a side surface of the casing so as to be elongated in a longitudinal direction of the casing.

The fitting portions of the side switch member may be formed symmetrically in relation to a groove formed in the rear surface of the side switch member along a longitudinal axis; each of the fitting portions may have an indented portion for receiving the fulcrum of the casing and a hook portion for preventing the detachment of the side switch member from the fulcrum; and the right and left fitting portions may be resiliently deformed in such a direction that the right and left fitting portions come close to each other when the side switch member is attached to the fulcrums of the casing using the right and left fitting portions, but the right and left fitting portions resiliently resume their original shape after the fulcrums are received by the indented portions.

In the second aspect of the present invention, a side switch mechanism provided on a substantially cylindrical casing of a stylus pen which has a resonance circuit and a plurality of switching elements for inputting at least coordinate and switching information, the side switch mechanism being operated so as to turn on at least either of two specific switching elements among the plurality of switching elements at one time, the side switch mechanism comprises:

a side switch member having a surface construction including a pair of knobs which are longitudinally spaced apart from each other so as to press one of the knobs when the corresponding switching element is turned on, and a rear surface construction including a pair of pressing sections made of projections, each being provided on the rear surface so as to correspond to each knob, the pressing sections turning on only one of the two switching elements when a corresponding one of the pair of knobs is pressed, and fitting portions for attaching the side switch member to the casing at the substantial center between the pair of switch pressing sections, and fulcrums integrally formed in the casing for supporting the fitting portions, so that the side switch member pivots on the fitting portions, which serve as supporting points, in such a way that one of the pair of the knobs moves downwards when that knob is pressed whereas the other knob moves inversely, wherein the knob positioned closer to the leading end of the casing, among the pair of knobs, is situated lower than the knob positioned closer to the rear end of the casing with respect to the surface of the casing.

Here, the fulcrums integrated with the casing may be formed into a pair of projections protruding from opposing areas along the circumferential edge of an opening formed in a side surface of the casing so as to be elongated in a longitudinal direction of the casing.

In the surface construction of the side switch member, a surface between the substantial center, between the pair of knobs, and the knob positioned closer to the rear end may be formed into a concavely warped surface having a curvature radius of 10 to 100 mm.

In the surface construction of the side switch member, a non-slip grip consisting of a plurality of grooves may form at the substantial center of the pair of knobs in a direction perpendicular to the longitudinal direction.

In the side switch mechanism according to the present invention, the support portion for pivotally supporting the side switch member is integrated with the casing. Such a construction renders the use of an independent supporting member unnecessary, and therefore it is possible to reduce the number of components. Further, since the supporting member is neither disposed in a casing nor mounted on a substrate, the occupation of a mounting space by the supporting member is prevented. The fitting portions of the side switch member are resiliently deformed, and therefore the side switch member can be fitted to the casing in one step, thereby facilitating the assembly of the side switch stylus pen.

Further, the switch knob on the rear end is positioned higher than the switch knob on the front end of the side switch member in relation to the surface of the casing. As a result, the distance of the movement of a finger between the switch knobs is reduced. Moreover, the side switch is formed to have a curved surface having a curvature radius to make it fit the rounded surface of a finger tip, so that a contact area between the finger tip and the outer surface of the side switch becomes larger. This enables stable operation.

As described above, according to the present invention, the side switch mechanism which allows only one of the two switching elements to be turned on at one time, and the stylus pen having such a side switch mechanism, make it possible to implement a side switch mechanism having a simple construction and superior operability, as well as to ensure reliable operation. In addition, the number of components is reduced, and assembly operability is improved, thereby resulting in reduced cost.

BRIEF DESCRIPTION OF THE DRAWINGS

FIGS. 4A and 4B are top and side views, respectively, of the stylus pen in the embodiment of the present invention.

DESCRIPTION OF THE PREFERRED EMBODIMENT

Referring to the accompanying drawings, an embodiment of the present invention will now be described in more detail.

Figure 3:
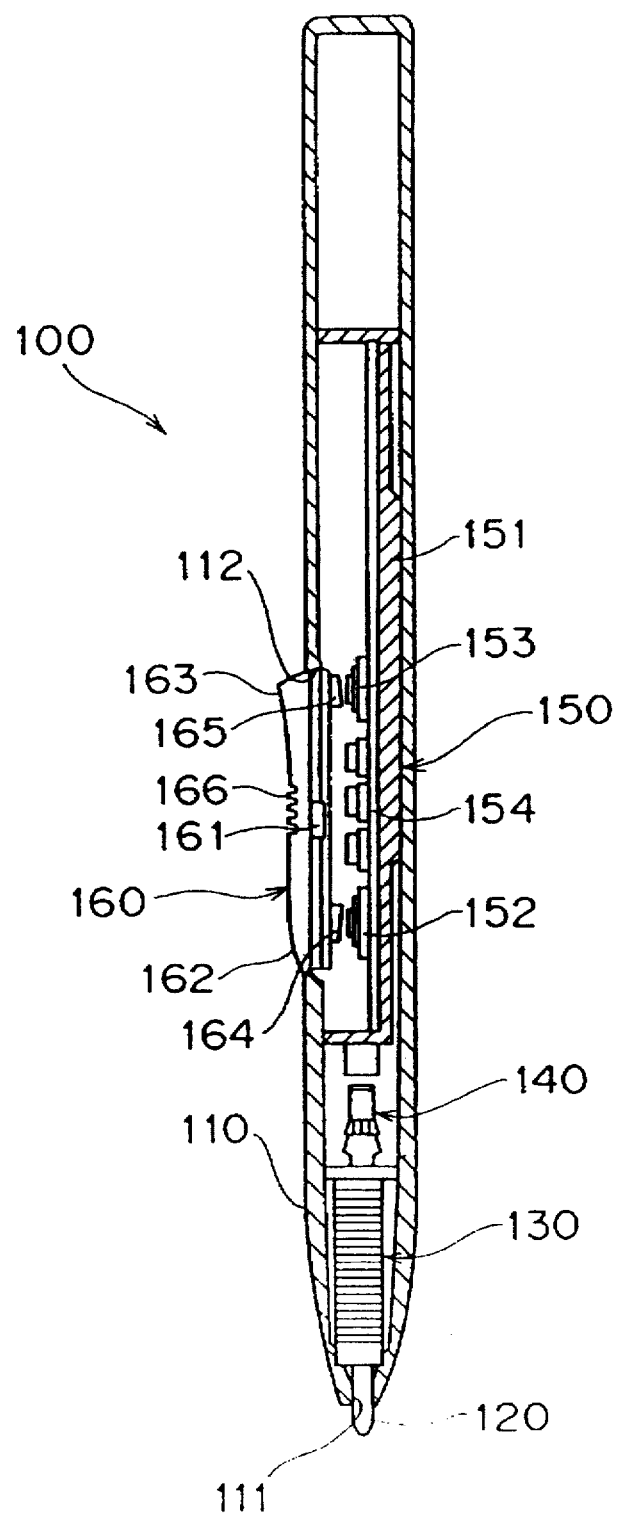
FIG. 3 is a longitudinal cross-sectional view of a stylus pen in one embodiment of the present invention.

FIG. 3 is a partial longitudinal view of a stylus pen having a side switch mechanism in one embodiment. FIGS. 4A and 4B are the front and side views of the stylus pen. A stylus pen 100 in the embodiment has a cylindrical casing 110, as an outer sheath, which is made of non-metallic materials, for example, synthetic resins. The cylindrical shape of the casing 110 is designed so as to be similar to the shape of an ordinary writing implement, thus allowing for familiar operability. For this reason, the casing 110 is usually tapered, and an opening 111 is formed at its leading end through which a nib passes. The casing 110 houses a nib 120 with its tip end projecting from the opening 111, a coil unit 130 held around the nib 120, a pen-down switch unit 140 which holds the inserted rear ends of the coil unit 130 and the nib 120, and an electronic component unit 150. The nib 120 is a rod-shaped member with its tip end being shaped into a substantially small hemisphere, and is removably attached to the casing 110. The coil unit 130 is made of a litz wire which has a small high frequency resistance and is coiled around a ferrite core, and the ferrite core has a through hole into which the nib 120 is inserted. The pen-down switch unit 140 houses therein a variable capacitor which forms a resonance circuit together with the coil unit 130, and a capacitance value of the variable capacitor varies when pressed by the rear end of the nib 120. A conventionally known pen-down switch unit is usable for the pen-down switch unit 140. For example, either a pen-down switch unit capable of detecting variations in a tool force level or an on-off type two-staged operation pen-down switch unit may be used. The electronic component unit 150 is made of a plate 151, extending to the rearward of the pen-down switch unit 140, on which a printed board 154 is mounted. On the printed board 154 are mounted two switching elements 152 and 153 for obtaining switching information, and additional electronic components such as coils or capacitors which are connected to or disconnected from the resonance circuit by turning on and off electrical contacts of the respective switching elements 152 and 153.

The casing 110 also has a side switch member 160 for turning the switching elements 152 and 153 on and off. This side switch member 160 is provided in such a position that a user can easily operate the stylus pen with a forefinger or thumb when holding it like a writing implement. Normally, the side switch member 160 is provided in a position closer to the tip end from the longitudinal center of the stylus pen. A pair of knobs 162 and 163 which the user presses to carry out a switching operation are formed on the top surface of the side switch member 160. The knobs 162 and 163 are spaced substantially the same distance apart from the center of the side switch member 160. In this embodiment, the knobs are not independent members but portions of the surface of the side switch member 160. A non-slip grip 166 which consists of several pieces of indentations and has an irregular cross section is formed at substantially the center of the surface of the side switch member 160 for preventing the slip of the user's finger.

Switch pressing sections 164 and 165 made of column-shaped projections are provided on the rear surface of the side switch member 160 so as to respectively correspond to the knobs 162 and 163. The switching elements 152 and 153 provided on the substrate 154 are arranged so as to be positioned just below the switch pressing sections 164 and 165. Surfaces of the switching sections 164 and 165 which face the switching elements 152 and 153 are flat and have an area sufficient to press the switching elements 152 and 153 when coming into contact with the tops of them. Fitting portions 161 attach the side switch member 160 to the casing 110. In the embodiment, the fitting portions 161 are fitted to projecting fulcrums (which are not shown in the drawing but will be described later) formed along the peripheral edge of an opening 112 of the casing 110. As will be described later in detail, the side switch member 160 is pivotable on the fulcrum (in the direction perpendicular to the drawing sheet) of the casing 110 about the fitting portions 161.

The operation of the side switch member 160 when switching information is input using the stylus pen 100 shown in FIG. 3 will now be described. The knob 162 moves to the inside of the casing 110, whereas the knob 163 moves to the outside of the casing 110. To be more accurate, the side switch member 160 slightly pivots counterclockwise about the fitting portions 161. At this time, the switch pressing section 164 provided on the rear surface of the knob 162 presses the top of the switching element 152 on the board 154, as a result of which the electrical contact of the switching element 152 is closed. On the other hand, when the knob 163 is pressed, reverse operations will be implemented. In other words, the side switch member 160 slightly pivots clockwise on the fitting portions 161. As a result, the electrical contact of the switching element 153 is closed. When the side switch member 160 is in a normal position, the switch pressing sections 164 and 165 and the tops of the switching elements may be in contact with each other so long as they do not exert any pressure on each other. Alternatively, the switch pressing sections and the tops of the switching elements may be spaced away from each other with a slight gap between them. If they are spaced away from each other, the gap must be set to such an extent that a stroke necessary for the switch pressing section to press the switching element is sufficiently assured. The side switch member 160 is supported by the fitting portions 161 in such a way that it becomes stable without pressing either of the switching elements 152 and 153 as shown in FIG. 3. When the knobs 162 and 163 are released from their pressed states, the side switch member 160 returns to its stable position. Further, the tops of the switching elements 152 and 153 are usually supported by respective spring mechanisms. Therefore, the switch pressing section is also pushed upward by repulsion occurring when the top of the switching element returns to its original position from its depressed state, thereby assisting in returning the side switch member 160 to its stable position.

In this way, the side switch member 160 moves like a seesaw with the fitting portions 161 (a fulcrum of the casing) being used as fulcrums. For this reason, it is possible for the side switch member 160 to press either of the pair of knobs 162 and 163 but impossible to press both at the same time.

Figure 1:
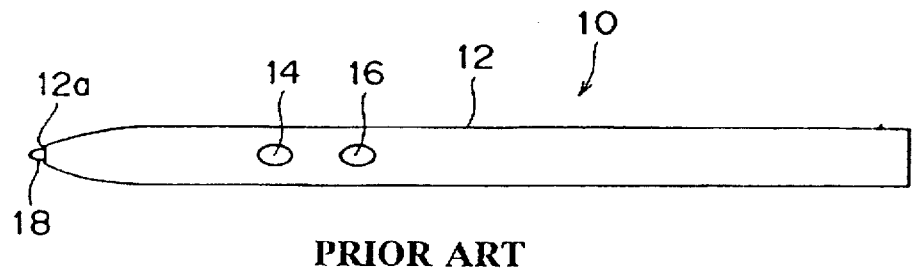
FIG. 1 is a top view showing a conventional stylus pen having two side switches.
Figure 2A:
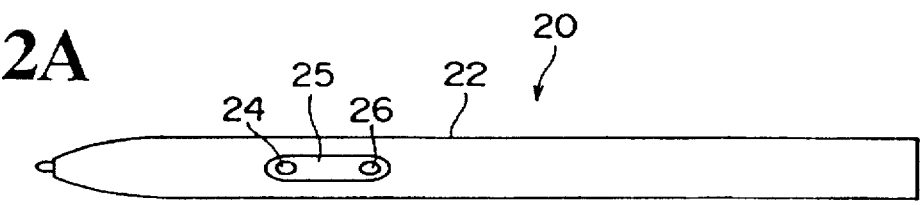
FIGS. 2A to 2C are a top view, a side view, and a side cross-sectional view, respectively, of a conventional stylus pen having a see-saw type side switch.
Figure 2B:
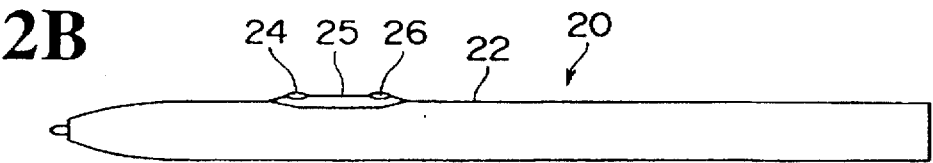
Figure 2C:
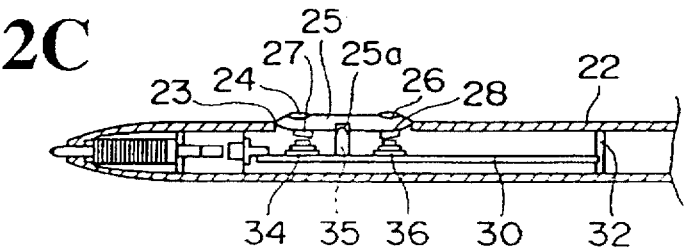

In this respect, the side switch member 160 is the same as the conventional side switch member shown in FIGS. 2A to 2C. The feature of the present invention lies in the supporting construction of the fitting portion 161 of the side switch member 160 and the shape of the side switch member 160. As shown in the front and side views shown in FIGS. 4A and 4B, the side switch member 160 is fitted in a substantially elongated opening 112 formed in the casing 110. FIG. 4b is a side elevation view of the side switch member 160. Assuming that the surface of the casing 110 is taken as a reference, the distance between the casing surface and the knob 162 positioned closer to the tip end of the stylus pen is shorter than the distance between the casing surface and the knob 163 positioned closer to the rear end portion of the stylus pen. The area between the center of the side switch member 160 and the knob 163 on the rear end has a slightly curved surface 168. The rear end portion of the side switch member 160 is made of a rear wall 169 which makes an obtuse angle closer to 90 degrees with respect to the casing surface. When viewed from the side surface, the stylus pen has an angular projection made by the curved surface 168 and the rear wall 169. A crest 170 is located immediately behind the knob 163.

The curved surface 168 is formed allowing for improved operability achieved as a result of increasing the contact area between the side switch member 160 and the rounded pad of the user's forefinger or thumb. To increase the contact area, the curvature radius is at an optimum so as to fit the shape of the rounded pad of the user's finger. As a result, the curved surface 168 can fit the user's finger, and a sufficient contact area can be assured. The shape of the rounded pad of the user's finger differs depending on the individual and their kinds of fingers. However, the pad of a finger inherently possesses resiliency and flexibility, and therefore it is unnecessary to set the curvature radius of the curved surface in a strict manner. In the previously mentioned embodiment, the curvature radius of the curved surface between the knob 163 in the rear end and the substantial center between the knobs 162 and 163 is set in the range 10 to 100 mm. As a result, it became evident that the curved surface can be effectively applied to any case.

The difference in height between the knob 162 and the knob 163 in relation to the surface of the casing 110 results in the following advantageous effects. Specifically, when a finger moves from one knob to the other knob, it only needs to move a short distance when compared with a conventional side switch. Therefore, it is possible for the user to carry out the input operation of switching information more smoothly, thereby leading to improved operability.

Figures 5A, 5B:
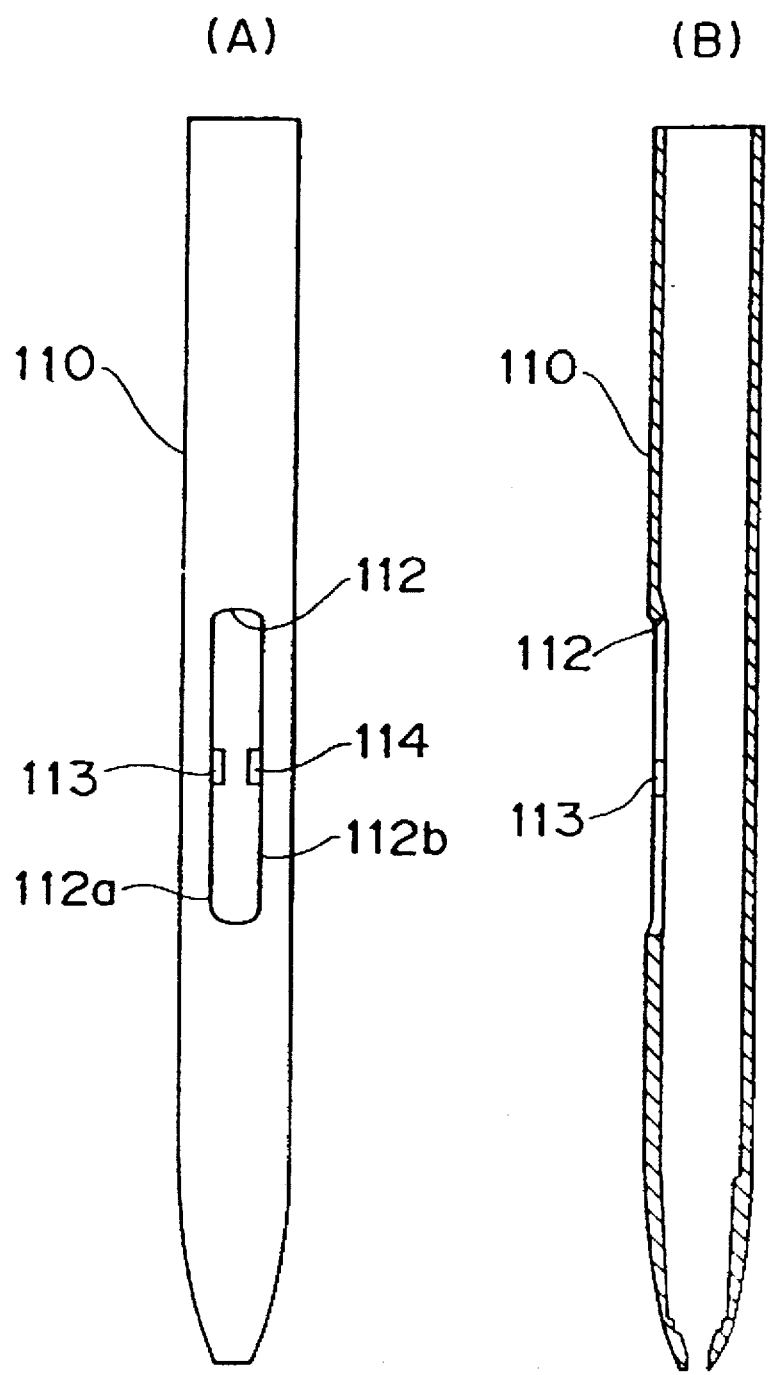
FIGS. 5A and 5B are top and longitudinal cross-sectional views, respectively, of a casing of the stylus pen in the embodiment.

FIGS. 5A and 5B are a plane view and a side cross-sectional view, respectively, of the casing 110. The casing 110 has the opening 112 to which the side switch member 160 is attached. The opening 112 has a substantially elongated peripheral edge which allows the accommodation of the side switch member 160. In addition, the peripheral edge of the opening 112 has a pair of switch fulcrums 113 and 114 which are intended to allow the side switch member 160 to be pivotally supported as well as to be fittedly attached. As shown in FIG. 5A, the pair of switch fulcrums 113 and 114 have the same shape and are formed as a pair of rectangular projections which respectively protrude from the centers of two circumferential edges 112a and 112b. FIG. 5B shows only one fulcrum, that is, the fulcrum 113. The fulcrum 113 is formed to have the same thickness as the casing 110. This is true of the fulcrum 114. These fulcrums 113 and 114 should preferably be integrated with the casing 110, as a part thereof, when the casing 110 is molded.

The integral molding of the fulcrums 113 and 114 together with the casing 110 makes it possible to reduce the number of parts used for conventional fulcrums. In the prior art, the fulcrums are mounted to a substrate or substrate holder. However, the present invention makes it possible to omit steps required for such a mounting operation, which prevents the occupation of the space above the substrate or the inside of the casing by parts for use as the supporting points. Accordingly, the mounting space of electronic components is prevented from being made narrow by the fulcrums.

Figure 6A:
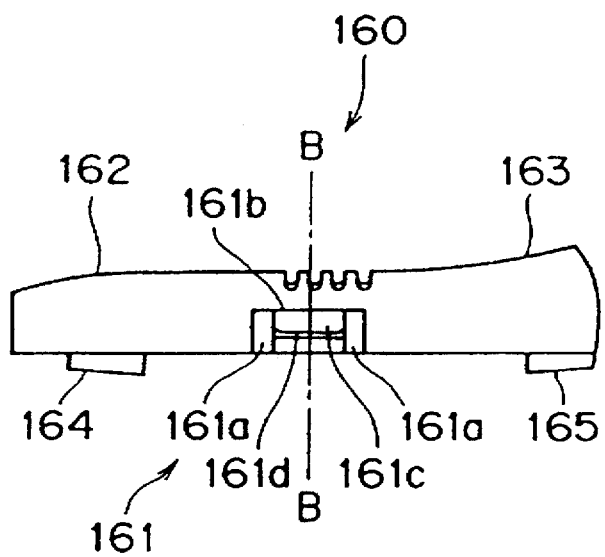
FIGS. 6A–6D are schematic representations showing the construction of a side switch member in one embodiment of the present invention.
Figure 6B:
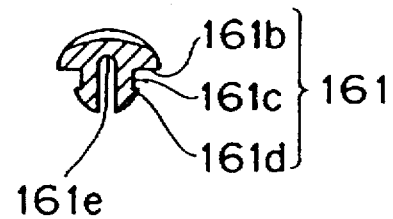
Figure 6C:
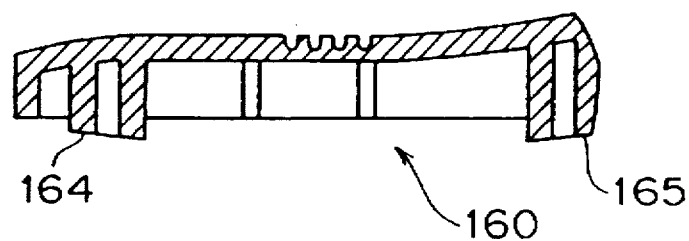
Figure 6D:
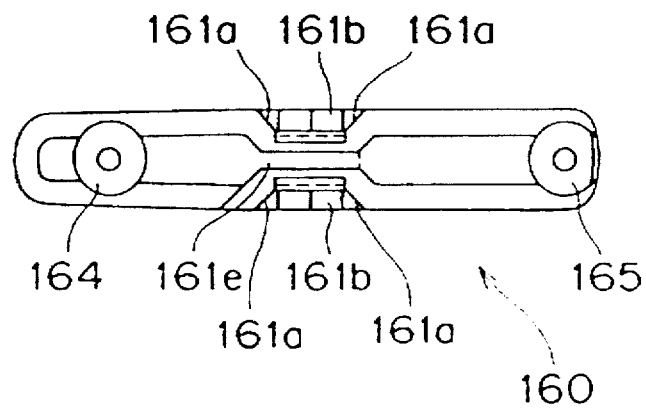

FIGS. 6A to 6D are schematic representations showing the detailed construction of the side switch member 160. FIG. 6A is a side elevation view of the side switch member 160; FIG. 6B is a transverse cross-sectional view of the same taken along line B—B shown in FIG. 6A; FIG. 6C is a longitudinal cross-sectional view of the same; and FIG. 6D is a bottom view of the same. Fitting portions 161 of the side switch member 160 to be fitted to the fulcrums 113 and 114 of the casing 110 are formed as recesses at the longitudinal center of the rear surface of the side switch member 160. As shown in FIG. 6A, the recess is surrounded by side walls 161a and an upper wall 161b with a lower part thereof (the lower side of the recess in the drawing) being opened. The fitting portion 161 has an indented portion 161c which has an indented plane, and a flanged hook portion 161d provided below the indented portion 161c. The shapes of the indented portion 161c and the hook portion 161d will become more clear with reference to the transverse cross-sectional view of FIG. 6B. As shown in FIG. 6B, the fitting portion 161 is provided on each side of the side switch member 160 in a symmetrical manner in relation to the longitudinal axis of the side switch member. A groove 161e is formed in the side switch member 160 along the longitudinal axis thereof between the left side fitting portion and the right side fitting portion.

When the side switch member 160 is attached to the casing 110, the fulcrums 113 and 114 of the casing 110 are respectively received by the indented portion 161c formed on both sides of the side switch member 160. The hook portions 161d hold the side switch member 160 so as to prevent the detachment of the fulcrums 113 and 114.

FIG. 6C is a longitudinal cross-sectional view of the side switch member 160. The feature of this side switch member 160 is in that the end faces of the switch pressing sections 164 and 165 are not flat but tapered. The switch pressing sections 164 and 165 are tapered in such way that the ends of the pressing sections facing the center of the side switch member 160 are higher than the other ends of them. This tapered construction takes into consideration the previously mentioned pivotal movement of the side switch member 160 on the center thereof which is used as a fulcrum. More accurately, as each switch pressing section comes close to each switching element as a result of the depression of the knob, the switch pressing section is pivotally moved. For this reason, to assure stable pressing of the top of the switching element, the switch pressing section is designed in such a way that a pressing plane of the switch pressing section becomes horizontal at the time when the switch pressing section presses the switching element. The pressing planes of the switch pressing sections 164 and 165 in the embodiment shown in FIG. 6D are annular, but the shape of the pressing planes is not limited to this shape. So long as sufficient pressing of the top of the switching element is obtained, the pressing plane may assume any shape.

Figure 7A:
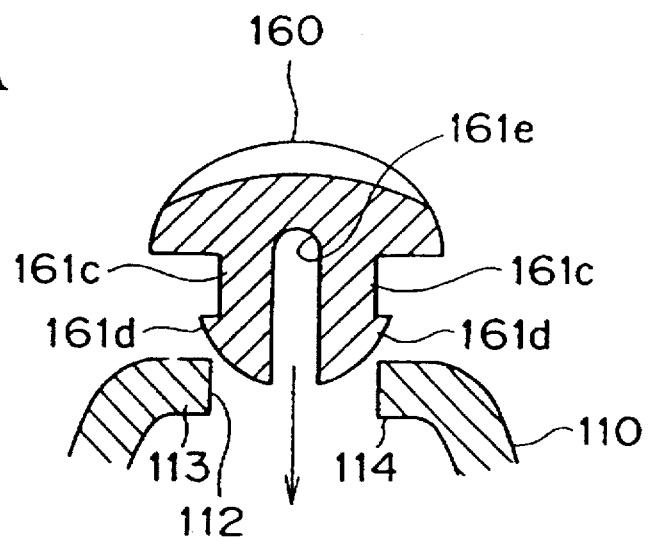
FIGS. 7A to 7C show steps of attaching the side switch member of the embodiment to the casing.
Figure 7B:
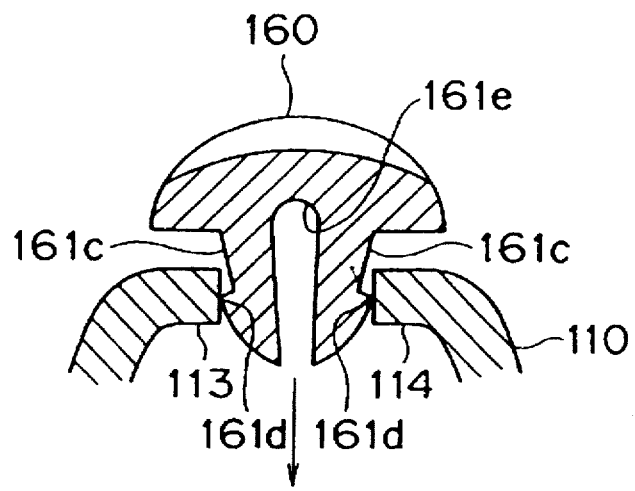
Figure 7C:
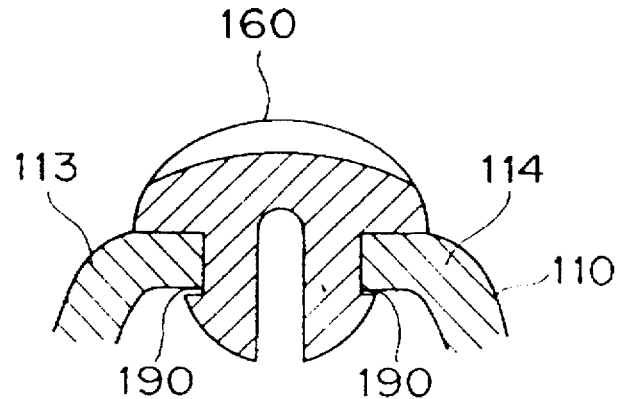

FIGS. 7A to 7C are schematic representations showing the processes of attaching the side switch member 160 to the casing 110, and they are transverse cross-sectional views similar to FIG. 6B. As shown in FIG. 7A, the side switch member 160 is aligned to the opening 112 of the casing 110, and then the side switch member is pressed into the casing 110. While being pressed into the casing 110, the fitting portions 161 formed on both sides of the side switch member 160 are resiliently deformed to the inside due to the groove 161e formed between the fitting portions 161. The deforming action enables the hooks 161d to pass between the fulcrums 113 and 114. After the hooks 161d have passed through the opening, the fitting portions 161 resume their original shapes. The fulcrums 113 and 114 are received by the indented portions 161c of the fitting portions 161. The side switch member 160 is hooked by the flanges of the hook portions 161d.

In this way, the side switch member 160 can be very easily attached to the casing 110 in one step. The previously mentioned attaching method and hook construction are techniques commonly employed. The size of the internal space of each indented portion 161c is made slightly larger than the size of the fulcrums 113 and 114, thereby providing the indented portions 161c with play 190 when the fulcrums 113 and 114 are held by the hook portions. As a result, the side switch member 160 becomes pivotable on the axis between the fulcrums 113 and 114. In other words, the fitting portions 161 of the side switch member 160 serve as a shaft bearing.

Figure 8A:
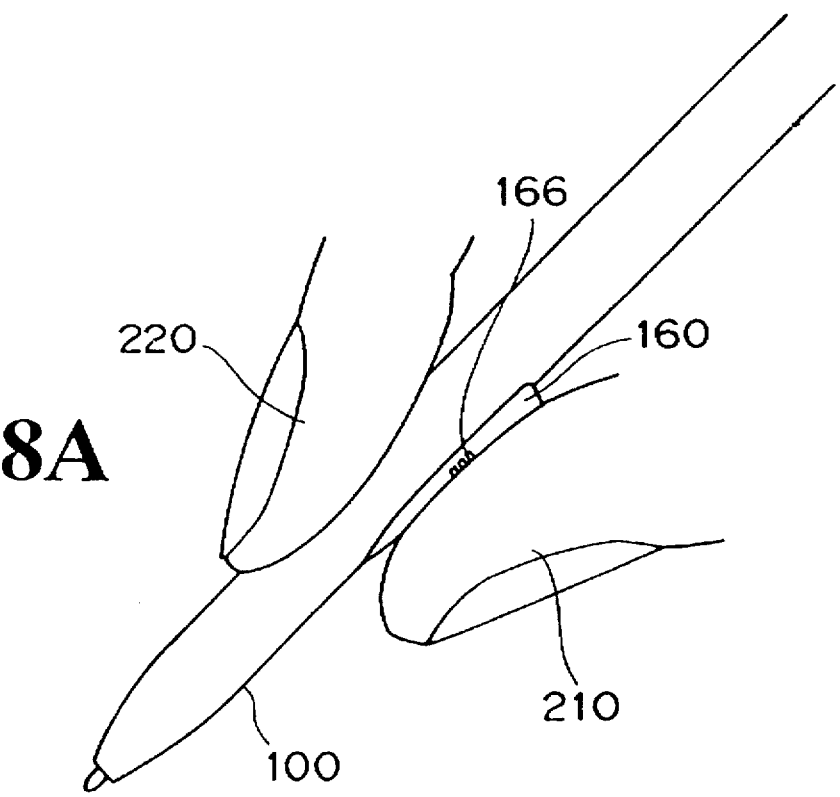
FIGS. 8A and 8B are side and partial cross-sectional views, respectively, showing the stylus pen in the embodiment when it is in use.
Figure 8B:
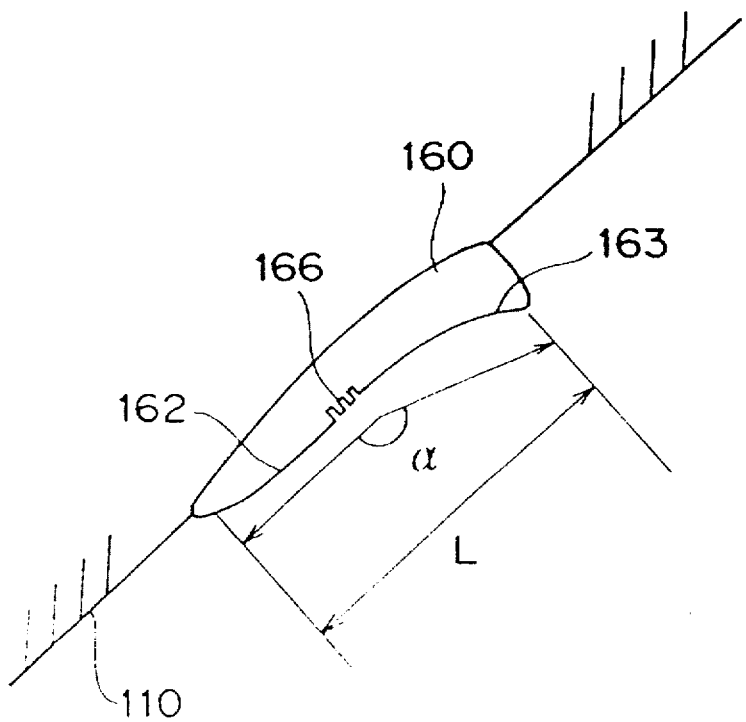

FIG. 8A is a schematic representation showing the stylus pen 100 of the present invention when it is in practical use. FIG. 8A shows the case where the side switch member 160 is operated by a thumb. As can be seen from the drawing, the side switch member 160 of the present invention has a surface geometry which fits the rounded pad of the thumb when the stylus pen is in use. As shown in FIG. 8B, in the side switch member 160 of the present invention, the line between the center of the side switch member and the knob 162 and the line between that center and the knob 163 make a predetermined obtuse angle which is smaller than 180 K, and the substantial distance L between the knobs is set to a distance in which the user can most easily operate the side switch member. Practically, it only needs the user to shift the point of force without substantially moving their thumb. When it is unnecessary to press the side switch member 160, the user can fixedly hold the stylus pen exerting force on the non-slip grip 166 provided at the center of the side switch member. FIGS. 8A and 8B show the example in which the side switch member is operated by a thumb. However, the same result is obtained even when the side switch member is operated by a forefinger.

The mechanism consisting of the combination of the fitting portions of the side switch member and the fulcrums of the casing is not limited to that of the embodiment, but various general-purpose mechanisms may be applied instead of that one.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A side switch mechanism provided on a substantially cylindrical casing of a stylus pen which has a resonance circuit and a plurality of switching elements for inputting at least coordinate and switching information, the side switch mechanism being operated so as to turn on at least either of two specific switching elements among the plurality of switching elements at one time, the side switch mechanism comprising:

a side switch member having
a surface construction including a pair of knobs which are longitudinally spaced apart from each other so as to press one of the knobs when the corresponding switching element is turned on, and a rear surface construction including
a pair of pressing sections made of projections, each being provided on the rear surface so as to correspond to each knob, the pressing sections turning on only one of the two switching elements when a corresponding one of the pair of knobs is pressed, and fitting portions for attaching the side switch member to the casing at the substantial center between the pair of switch pressing sections, and fulcrums integrally formed in the casing for supporting the fitting portions, which serve as supporting points, so that the side switch member pivots on the fitting portions in such a way that one of the pair of the knobs moves downwards when that knob is pressed whereas the other knob moves inversely.

2. The side switch mechanism as defined in claim 1, wherein the fulcrums integrated with the casing are formed as a pair of projections protruding from opposing areas along the circumferential edge of an opening formed in a side surface of the casing so as to be elongated in a longitudinal direction of the casing.

3. The side switch mechanism as defined in claim 1, wherein the fitting portions of the side switch member are formed symmetrically in relation to a groove formed in the rear surface of the side switch member along a longitudinal axis; each of the fitting portions has an indented portion for receiving the fulcrum of the casing and a hook portion for preventing the detachment of the side switch member from the fulcrum; and the right and left fitting portions are resiliently deformed in such a direction that the right and left fitting portions come close to each other when the side switch member is attached to the fulcrums of the casing using the right and left fitting portions, but the right and left fitting portions resiliently resume their original shape after the fulcrums are received by the indented portions.

4. The side switch mechanism as defined in claim 2, wherein the fitting portions of the side switch member are formed symmetrically in relation to a groove formed in the rear surface of the side switch member along a longitudinal axis; each of the fitting portions has an indented portion for receiving the fulcrum of the casing and a hook portion for preventing the detachment of the side switch member from the fulcrum; and the right and left fitting portions are resiliently deformed in such a direction that the right and left fitting portions come close to each other when the side switch member is attached to the fulcrums of the casing using the right and left fitting portions, but the right and left fitting portions resiliently resume their original shape after the fulcrums are received by the indented portions.

5. A side switch mechanism provided on a substantially cylindrical casing of a stylus pen which has a resonance circuit and a plurality of switching elements for inputting at least coordinate and switching information, the side switch mechanism being operated so as to turn on at least either of two specific switching elements among the plurality of switching elements at one time, the side switch mechanism comprising:

a side switch member having
- a surface construction including a pair of knobs which are longitudinally spaced apart from each other so as to press one of the knobs when the corresponding switching element is turned on, and
- a rear surface construction including
  - a pair of pressing sections made of projections, each being provided on the rear surface so as to correspond to each knob, the pressing sections turning on only one of the two switching elements when a corresponding one of the pair of knobs is pressed, and
  - fitting portions for attaching the side switch member to the casing at the substantial center between the pair of switch pressing sections, and
- fulcrums integrally formed in the casing for supporting the fitting portions, so that the side switch member pivots on the fitting portions, which serve as supporting points, in such a way that one of the pair of the knobs moves downwards when that knob is pressed whereas the other knob moves inversely, wherein the knob positioned closer to the leading end of the casing, among the pair of knobs, is situated lower than the knob positioned closer to the rear end of the casing with respect to the surface of the casing.

6. The side switch mechanism as defined in claim 5, wherein the fulcrums integrated with the casing are formed into a pair of projections protruding from opposing areas along the circumferential edge of an opening formed in a side surface of the casing so as to be elongated in a longitudinal direction of the casing.

7. The side switch mechanism as defined in claim 5, wherein, in the surface construction of the side switch member, a surface between the substantial center, between the pair of knobs, and the knob positioned closer to the rear end is formed into a concavely warped surface having a curvature radius of 10 to 100 mm.

8. The side switch mechanism as defined in claim 6, wherein, in the surface construction of the side switch member, a surface between the substantial center, between the pair of knobs, and the knob positioned closer to the rear end is formed into a concavely warped surface having a curvature radius of 10 to 100 mm.

9. The side switch mechanism as defined in claim 5, wherein, in the surface construction of the side switch member, a non-slip grip consisting of a plurality of grooves formed at the substantial center of the pair of knobs in a direction perpendicular to the longitudinal direction.

10. A stylus pen comprising the side switch mechanism as defined in claim 1.

11. A stylus pen comprising the side switch mechanism as defined in claim 5.

* * * * *